UNITED STATES PATENT OFFICE.

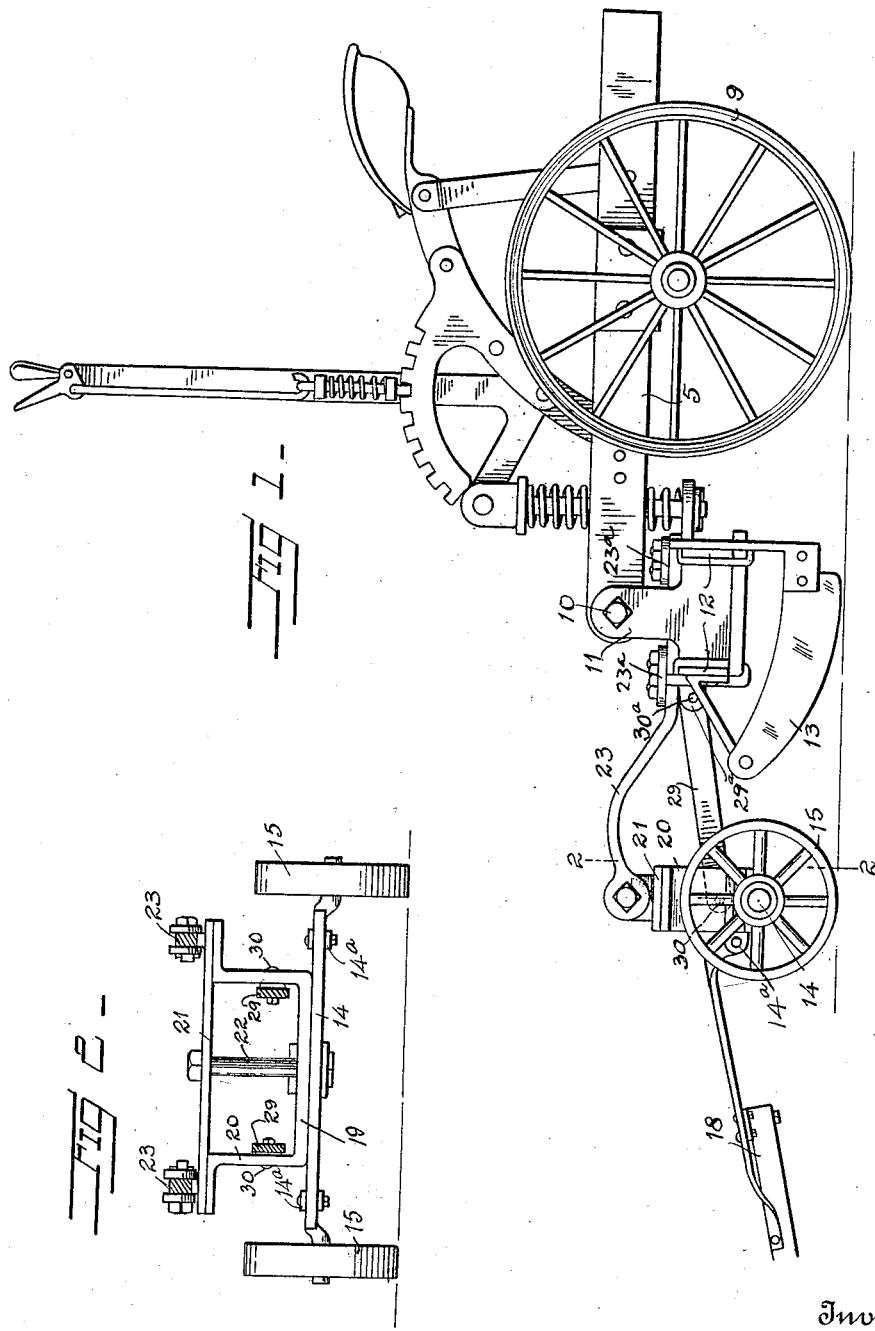

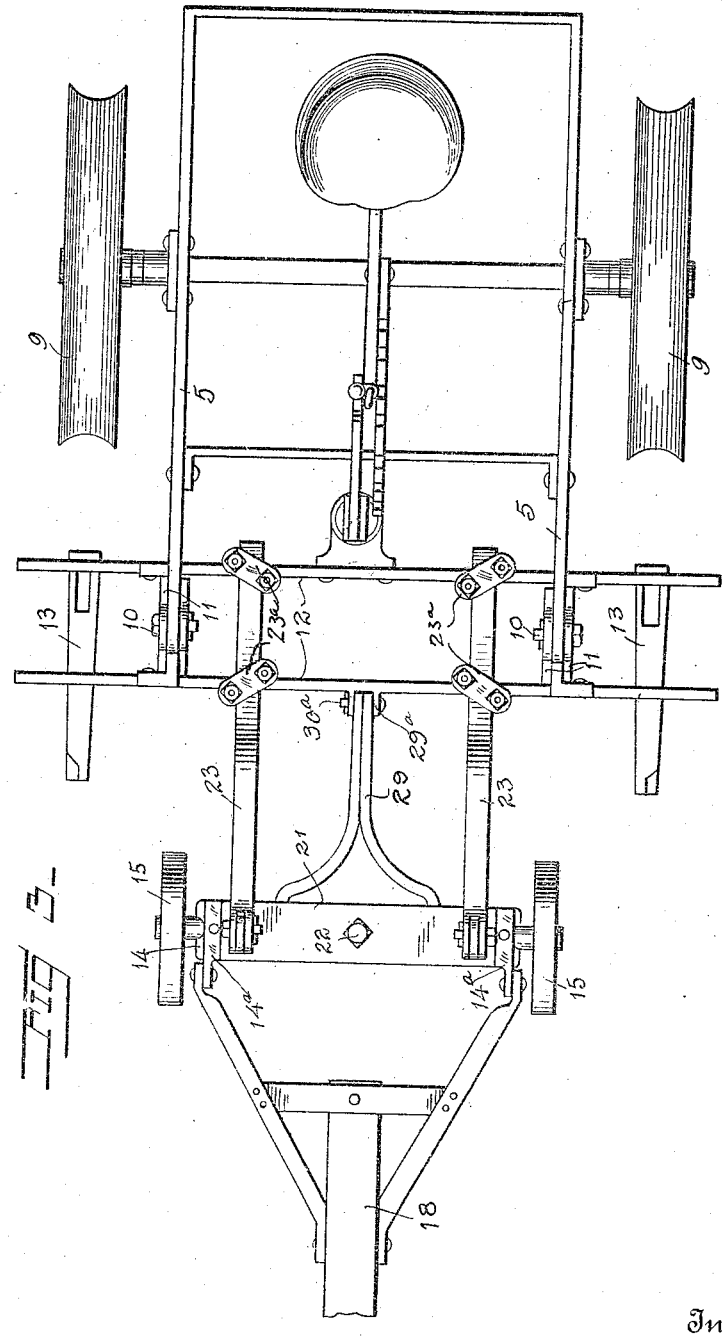

JELTE R. MULDER, OF ROSELAWN, INDIANA.

CORN-PLANTER.

1,295,566.  Specification of Letters Patent.  Patented Feb. 25, 1919.

Application filed August 13, 1918.  Serial No. 249,656.

*To all whom it may concern:*

Be it known that I, JELTE R. MULDER, a citizen of the United States, residing at Roselawn, in the county of Newton and State of Indiana, have invented new and useful Improvements in Corn-Planters, of which the following is a specification.

This invention relates to improvements in the corn planter disclosed in Patent No. 1104214, the object of the invention being to provide a structure which enables the implement to make short turns, and with this object in view, the invention consists in a novel combination and arrangement of parts to be hereinafter described and claimed.

In order that the invention may be better understood, reference is had to the accompanying drawings forming a part of this specification, and in said drawings, Figure 1 is a side elevation of the machine;

Fig. 2 is a cross section on the line 2—2 of Fig. 1, and

Fig. 3 is a plan view.

Referring specifically to the drawings, the machine comprises a main wheeled frame having a pivoted frame at its forward end which carries the furrow openers, as well as the seed boxes and the mechanism associated therewith, said mechanism and the seed boxes not being illustrated as they form no part of the present invention. In front of the pivoted frame is a two-wheeled truck having a connection with the frame as will be presently described.

As in the patent hereinbefore referred to, the main frame has side bars 5 and ground wheels 9, and to the front ends of the side bars are pivoted, as indicated at 10, depending bracket members 11 carrying a pair of cross bars 12 which support the furrow openers 13, said parts 11 and 12 forming the pivoted frame.

The truck hereinbefore mentioned comprises a pivoted axle 14 having spindles at its ends on which are journaled ground wheels 15. To this axle are attached clips 14ª for securing a draft tongue 18. On the axle 14 is mounted a bolster plate 19 having upstanding end portions 20 supporting at the top a cross bar 21. A kingbolt 22 passes through the axle 14 and the parts 19 and 21, which permits the axle to be swung around to guide the machine.

The truck is connected to the cross bars 12 of the pivoted frame by a pair of arched beams 23 as in the patent hereinbefore referred to, four clips 23ª being used.

The truck is also connected to the pivoted frame by a pair of draft links 29. In the previous patent these links are shown so positioned that they prevent the truck from being swung around far enough to make a short turn, the wheels 15 of the truck striking the links shortly after being swung around for the turn. In order to overcome this objection, the links have been so arranged that they lie inward of the wheels 15 a sufficient distance to permit the latter to be swung around far enough for short turns. As shown, the two links are connected at their forward ends to the upstanding parts 20 of the bolster plate 19 by pivot bolts 30, and then they are extended rearwardly in a converging manner, so that they lie closely alongside each other in the longitudinal center line of the machine, a sufficient distance inward of the wheel 15 so as not to interfere with the movement thereof for a short turn. The rear ends of the links seat between ears 29ª on the front cross bar 12, and they are pivoted thereto by a bolt 30ª.

The present form of the invention, in addition to enabling the vehicle to make short turns, also embodies all the advantages of my patented structure, which may be summed up as follows: The weight of the machine is carried on the truck, and no part thereof rests on the necks of the animals; the planting of corn at an equal depth is facilitated; the swinging of the tongue causes no unevenness or lateral deviation in rows planted; and the backing of the draft animals will not cause the furrow openers to clog.

I claim:

1. The combination of a wheeled frame having a pivoted part at its forward end, a truck in front of said pivoted part, said truck having an axle and a bolster which are pivotally connected, and draft connections between the bolster and the aforesaid pivoted part, said connections extending convergingly from the bolster and having their rear ends lying in the longitudinal center line of the machine.

2. The combination of a wheeled frame having a pivoted part at its forward end, a truck in front of said pivoted part, said truck having an axle and a bolster which are pivotally connected, and draft links connecting the ends of the bolster to the aforesaid pivoted part, said links extending convergingly from the bolster ends and having their rear ends lying in the longitudinal center line of the machine.

In testimony whereof I affix my signature.

JELTE R. MULDER.